UNITED STATES PATENT OFFICE.

JOSEPH DAVIES, OF BIRMINGHAM, ENGLAND.

FLUX FOR IRON.

No. 858,582.     Specification of Letters Patent.     Patented July 2, 1907.

Application filed April 2, 1906. Serial No. 309,572.

*To all whom it may concern:*

Be it known that I, JOSEPH DAVIES, a subject of King Edward VII, residing at Birmingham, in the county of Warwick, Great Britain, have invented certain new and useful Improvements for a Flux for Iron, and that I do hereby declare the following to be a full, clear, and exact description of the invention, such as will enable others skilled in the art to which it appertains to make and use the same.

My invention consists of a new and useful composition of matter, or flux, or physic, to be used for the treatment of pig iron. My composition, or flux, or physic consists of the following ingredients, combined in the proportions stated viz:—charcoal $\frac{2}{16}$ per cent, rock salt $\frac{1}{4}$ per cent, limestone $\frac{1}{3}$ per cent, plumbago $\frac{3}{32}$ per cent, soda $\frac{2}{3}$ per cent, manganese $\frac{1}{4}$ per cent, nickel $6\frac{1}{4}$ per cent. The aggregate of these ingredients is nearly eight per cent, the remaining ninety two per cent (approximate) being of the molten iron to which the said flux is added. These ingredients are to be thoroughly mixed up together, and applied while the metal is in a molten state. In using the above named composition, or flux, or physic, in the course of manufacture, the impurities in the iron are eliminated, and a better body and color is produced, and a greater tensile strength and density obtained.

The iron when finished is sound and free from slits, blow holes, and unsound parts which often occurs in the present mode of iron manufacture. The application of flux renders the pig iron in such a condition as to enable it being hardened and tempered and so adaptable for various manufacturing purposes for which steel is now used.

The effect of the various ingredients on the molten metal enables the nickel to assimilate with the iron, and so produce a white metal free from any impurities.

I apply the above composition to the metal when it is in a molten state either in a crucible, cupola, or blast furnace.

I may vary the proportions of ingredients above stated or substitute copper, tungsten or one of the precious metals for nickel, as needed in treating different classes of iron. By this process the impurities in the pig iron are set free and the nickel or other metal is incorporated with the iron. Such substitution of metals or changes in the proportions of the other ingredients of my formula will of course produce a metal of different color and slightly different properties, but free from impurities and defects. I am aware that flux or physic has been used for the treatment of iron for various processes; but I am not aware that all the ingredients of my composition have been used together for the fluxing of pig iron.

I claim:—

1. The herein-described composition of matter as a flux for pig iron, consisting of charcoal, rock-salt, limestone, plumbago, soda, manganese, and nickel, substantially as described and for the purpose specified.

2. The herein-described composition of matter for the treatment of pig iron, consisting of charcoal, rocksalt, limestone, plumbago, soda, manganese and a metal adapted to be incorporated with the iron.

3. A composition of matter for treating iron, consisting of charcoal, rock salt, limestone, plumbago, soda, manganese and nickel in approximately the proportions stated.

In testimony whereof, I have signed my name to this specification in the presence of two subscribing witnesses.

JOSEPH DAVIES.

Witnesses:
    FLORENCE MARY BARACLOUGH,
    WILLIAM HENRY BARACLOUGH.